Feb. 8, 1938.  H. PAUL  2,107,833

LIGHT DIFFUSING GLASS

Filed Aug. 26, 1935

Inventor

Henri Paul

By Mason Fenwick & Lawrence

Attorneys

Patented Feb. 8, 1938

2,107,833

UNITED STATES PATENT OFFICE 2,107,833

LIGHT DIFFUSING GLASS

Henri Paul, Montreal, Quebec, Canada

Application August 26, 1935, Serial No. 37,965

2 Claims. (Cl. 88—78)

The invention forming the subject matter of this application relates to panels of sheet material, which may be opaque or transparent, having one face plane and the other face shaped to provide reflecting surfaces formed by a series of interlocking pyramids whose plane faces are arranged at right angles to each other.

The main object of the invention is to provide a panel of this character in which the total reflecting properties of rectangular prisms are used to secure the maximum dispersion of any source of light incident upon the broken surface of an opaque reflecting panel, or passing through a transparent panel from the plane to the broken surface. In other words, this invention is designed for use in the form of panels to obtain maximum reflection of rays of light incident upon the broken surface when the panel is opaque; and, to obtain maximum diffusion of transmitted light from rays incident upon the plane surface of a transparent panel.

Other objects will become apparent as the detailed description of the invention proceeds.

In the drawing.

Referring to the drawing, in which similar parts are designated by like numerals.

Figure 1:
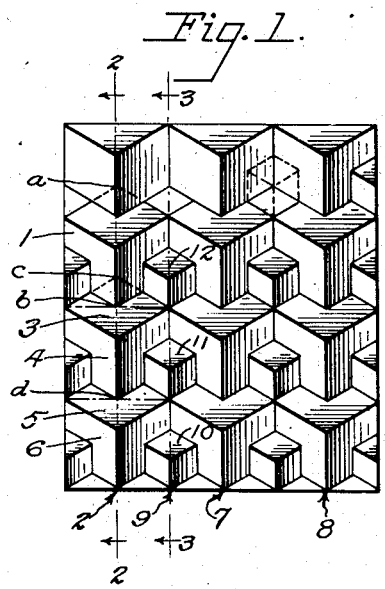
Figure 1 is a plan of one form of the invention.
Figure 2:
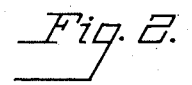
Figure 2 is a section taken on the line 2—2 of Figure 1.
Figure 3:
Figure 3 is a section taken on the line 3—3 of Figure 1.

In both forms of the invention the broken surfaces of the panel have the appearance of being formed by the superposition of similar cubes upon each other; and the differences in the appearance of these two forms is due to differences in relative position of the superposed cubes. The form of the invention illustrated in Figures 1, 2, and 3 shows a series of rows of cubes in which all the cubes of each row have their diagonals lying in the same plane; and, in which the diagonal of each cube penetrates the upper surface of the cube immediately below it at the center of said surface. For example, consider the cube 1 in the row designated generally by the reference character 2: It will be apparent that the diagonal $ab$ of the cube 1 penetrates the square surface 3 of the cube 4 exactly at the center of the said face 3. Similarly the diagonal $cd$ of the cube 4 penetrates the square face 5 of the lower cube 6 exactly at the center of the said face 5.

The same arrangement of superposed cubes occurs in the rows 7, 8, and all succeeding rows, depending, of course, upon the size of the panel. In order to increase the number of light reflecting or light diffusing pyramids, a series of smaller cubes is interposed between adjacent rows of the larger cubes. For example, between the rows 2 and 7 of the larger cubes there is interposed a row 9 of smaller cubes. Each of the smaller cubes has each of its sides exactly one-half the length of each side of the larger cubes; and has one of its edges aligned with the line of intersection of the two larger cubes immediately below it and in adjacent rows. It will be apparent from Figure 1 of the drawing that the diagonals of all the small cubes in the row 9 lie in the same plane, which is also the plane occupied by the intersecting edges of the larger cubes in the adjacent rows 2 and 7.

Figure 4:
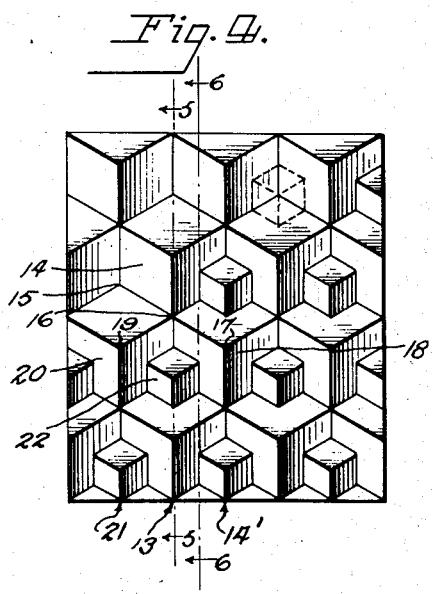
Figure 4 is a plan of another form of the invention.
Figure 5:
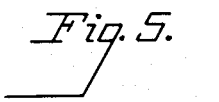
Figure 5 is a section taken on the line 5—5 of Figure 4.
Figure 6:
Figure 6 is a section taken on the line 6—6 of Figure 4.

The form of the invention illustrated in Figures 4, 5, and 6 has a different arrangement of the large and small cubes. It will be apparent from Figure 4 of the drawing that the cubes in each row are staggered with respect to each other. For example, in the row designated by the reference character 13 in Figure 4, the cube 14 has its edge 15—16 in alignment with the edge 16—17 of cube 18 in row 14' and at right angles to the line 16—19 of the cube 20 in row 21. In the solid angle formed between the adjacent faces of cubes 18 and 20, there is located the small cube 22, each side of which is one-half the length of each side of the adjacent larger cubes.

In the second form of the invention it will be apparent that large and small cubes occur in alternation and that the diagonals of the large and small cubes in each row lie in the same plane. It is evident that the rows of cubes in this form of the invention are exactly alike; whereas in the form of the invention shown in Figure 1 alternate rows only of large and small cubes are similar.

In each form of the invention, the broken light reflecting or light diffusing surface is formed on a base 23 which may have a thickness depending upon the uses to which the invention is to be put. Where the device is intended for light reflecting purposes only, it can be made of any suitable opaque material, such as sheet metal, which may be coated with a light reflecting surface such, for instance, as silver or the like. Where the device is intended for light diffusion purposes it can be made by casting glass in a suitable mold, or by rolling plastic glass between a plane surface and a roller shaped to form the inter-penetrating cubes of the broken surface.

Numerous variations may doubtless be devised by persons skilled in the art without departing from the principles of my invention. I, therefore, desire no limitations to be imposed on my invention, except such as are indicated in the appended claims.

What I claim is:

1. A light diffusing glass panel having one side flat and the other side shaped to form parallel contacting unbroken rows of interpenetrating right trihedral convex reflectors of similar dimensions, one edge of each reflector intersecting the center of one face of the adjacent reflector in the same row, all of such edges in each row lying in a plane perpendicular to said side, the intersecting surfaces between adjacent rows of convex reflectors forming a continuous unbroken row of concave right trihedral reflectors, and a row of smaller convex trihedral reflectors located in the angles formed by the intersecting faces of the said concave reflectors, one edge of each of the smaller trihedral reflectors being a continuation of the line of intersection between adjacent faces of said concave reflectors.

2. A light diffusing glass panel having one side flat and the other side shaped to form parallel contacting unbroken rows of interpenetrating right trihedral convex reflectors of similar dimensions, one edge of each reflector intersecting the center of one face of the adjacent reflector in the same row, all of such edges in each row lying in a plane perpendicular to said side, said convex reflectors having their apexes lying in a plane parallel to said flat side, the intersecting surfaces between adjacent rows of convex reflectors forming a continuous unbroken row of concave right trihedral reflectors which have their apexes in a plane also parallel to said side, and a row of smaller convex trihedral reflectors located in the angles formed by the intersecting faces of said concave reflectors, said smaller convex reflectors having their apexes lying in a plane parallel to and between the planes parallel to said side.

HENRI PAUL.